United States Patent
Maurer et al.

[11] Patent Number: 6,127,493
[45] Date of Patent: Oct. 3, 2000

[54] PRESSURE POLYMERIZATION OF POLYESTER

[75] Inventors: Charles J. Maurer, Matthews; Gordon Shaw, Charlotte, both of N.C.; Vicky S. Smith, Greenville, S.C.

[73] Assignee: Arteva North America S.A.R.L., Zurich, Switzerland

[21] Appl. No.: 09/185,998

[22] Filed: Nov. 4, 1998

[51] Int. Cl.[7] .................................. C08F 2/00; C08F 6/00
[52] U.S. Cl. ........................... 526/64; 528/176; 528/190; 528/193; 528/194; 528/195; 528/272; 528/275; 528/298; 528/302; 528/308; 528/308.6; 528/481; 528/492; 528/501; 528/503; 526/65; 526/71; 525/437
[58] Field of Search ................................. 528/272, 275, 528/298, 302, 308, 308.6, 481, 492, 501, 503, 176, 190, 193, 194, 195; 526/64, 65, 71; 525/437

[56] References Cited

U.S. PATENT DOCUMENTS 3,480,587  11/1969  Porter .......................................... 260/47
5,434,239   7/1995  Bhatia ........................................ 528/274

FOREIGN PATENT DOCUMENTS

WO96/22318   7/1996   WIPO .
WO96/39456  12/1996   WIPO .

*Primary Examiner*—Samuel A. Acquah
*Attorney, Agent, or Firm*—Gregory N. Clements

[57] ABSTRACT

A process is disclosed for the preparation of a polyester polymer or polyester copolymer under superatmospheric pressure conditions in a pipe or tubular reaction under turbannular flow conditions. Reaction material having a glycol equivalents to carboxylic acid equivalents mole ratio of from 1.0:1 to 1.2:1, together with a superatmospheric dense gaseous medium are fed co-currently to the reactor. Dicarboxylic acid and/or diol raw materials may be injected into any of the reaction zones in the process during operation to achieve the overall desired mole ratio balance. The process operates at temperatures of from about 220° C. to about 320° C., with turbannular flow achieved before the polymer product and gas exit the reactor process. The pressure in the reaction zones can be in the range from 15 psia to 2500 psia. A polymer product having a DP of a greater than 40, more preferably at least about 70, is achieved by the transfer of water from the reacting material polymer melt to the gaseous medium in the reactor.

44 Claims, 2 Drawing Sheets

Baker Plot for Two Phase Flow

Experimental Results

PRESSURE POLYMERIZATION OF POLYESTER

BACKGROUND OF THE INVENTION

1) Field of the Invention

The invention pertains to the field of polyester synthesis starting from a hydroxyalkyl dicarboxylic acid ester monomer and/or oligomer mixtures and polymerizing these to form a polyester. In particular the present invention is a polyesterification process preferably employing substantially mono(hydroxyalkyl) ester monomer such as monohydroxyethyl terephthalate, with preferably little or no bis(hydroxyalkyl) ester monomer.

The invention also pertains to the field of polyester synthesis starting from traditional raw materials of dicarboxylic acid and diol, reacting these raw materials to form hydroxyalkyl dicarboxylic acid ester monomer and/or oligomer mixtures (primarily monohydroxyalkyl ester monomer with little or no bis(hydroxyalkyl) ester monomer) and polyesterifying these to form a polyester. Both this reaction process and the previous mentioned reaction process occur in a pipe or tubular reactor at superatmospheric pressure wherein turbannular flow occurs.

2) Prior Art

Polyester manufacture is globally practiced, and a variety of methods are taught. The direct esterification of a dicarboxylic acid with a diol, for example terephthalic acid (TA) and ethylene glycol (EG), forms a reactive monomeric material releasing water. The monomeric material is known to contain the species monohydroxyethyl terephthalate, bis(hydroxyethyl) terephthalate, and longer-chain length oligomers of the same structural type having an average degree of polymerization (DP) of from 1 to 6. The DP is increased further by melt polymerization of the monomeric material under vacuum conditions, a process referred to as polycondensation.

A polymerization process is described in U.S. Pat. No. 3,480,587 to Porter where at least part of the polycondensation takes place while the liquid reaction mixture flows in a long, narrow tube with an inert gas such as nitrogen in a two phase flow regime called turbannular flow. The reaction mixture entering the tube has an average DP of from 27 to 40, and the product issuing from the tube has an intrinsic viscosity ratio between 1.7 and 2.0 (measured as a 1% solution in orthochlorophenol at standard conditions) corresponding to 65–100 DP. Porter teaches that in a pressure process using an inert gas "the ratio of the cross-sectional area of the tube divided by the length of the wetted perimeter should be less than 2.5 cm." To maintain this requirement for a tubular reactor, the diameter of the reactor must not exceed four inches.

As taught by Porter, a high weight ratio of gas to polymer is required for polymerization to proceed. To achieve a high weight ratio in the reactor tube high gas velocities are required. If a reaction material has a DP of 20 or less, particularly 10 or less, extremely high and impractical gas velocities would be required to achieve a practical increase in DP under turbannular flow. As taught by Porter, then, it would be economically infeasible to manufacture polyester from lower DP reaction materials in a tubular reaction zone under turbannular flow.

U.S. Pat. No. 5,434,239 to Bhatia discloses an atmospheric-pressure process for the continuous production of polyester via a melt of bishydroxyethyl terephthalate (BHET) or its low molecular weight oligomer. BHET is intimately contacted with nitrogen gas which flows countercurrent to the melt, to facilitate polymerization and removal of the volatile reaction by-products. A degree of polymerization of 15 to about 30 is achieved in the prepolymer stage. The DP is further increased to about 50–100 DP in the finishing stage with a countercurrent flow of nitrogen. Polymerization occurs in both stages without resorting to a vacuum. Bhatia teaches that the nitrogen velocity is critical to the success of the process, and that the nitrogen velocity should be between 0.2 and 5.0 ft/sec. The countercurrent flow process Bhatia describes does not include operation in the turbannular flow regime, which by definition is a co-current process.

WO 96/22318 to Iwasyk et al. discloses a multi-stage process for producing polyester oligomers without vacuum. In the first stage a polyol is added to esterified oligomer feed material in a pipeline reactor. Inert gas is injected into the oligomeric product at the end of the first stage, to carry the oligomeric material into the following stages. The inert gas also serves to provide a pressure drop along the tubular reactor, which aids in the removal of volatile reaction by-products. The amount of inert gas used in the process of Iwasyk et al. is less than two pounds per pound of oligomer, and the flow regime in the tubular reactors is not turbannular. It is taught that a prepolymer with a DP of from 2 to 40 and a carboxyl to hydroxyl end group balance between about 1:2 and 1:8 is produced at the exit of the final stage of the pipeline reactor. It would be desirable to efficiently and economically obtain a relatively higher DP polymer (40 or more) with a carboxyl to hydroxyl end group ratio that avoids premature arresting of the polymerization.

WO 96/39456 to DeSimone discloses a transesterification-polycondensation process for polyester using carbon dioxide as the polymerization medium. The polycondensation of BHET conducted in an autoclave with flowing supercritical carbon dioxide is exemplified. Ethylene glycol is liberated for every step growth in DP. A 10–50 mole percent excess of glycol is recommended. The highest DP achieved in the examples is 33. As exemplified by DeSimone, excess diol is removed by flowing carbon dioxide or by including a surfactant with carbon dioxide capable of scavenging the condensate within the reactor without removing carbon dioxide. Higher DP increases would be desirable without requiring purification of the diol to remove the surfactant. Furthermore, as demonstrated by DeSimone, a DP of about 33 was achieved in a continuous flow process starting with BHET. However, this required a relatively large amount of carbon dioxide, i.e., a weight ratio of carbon dioxide to BHET of 43:1.

In general, it is known that dicarboxylic acids and diols react with the removal of water to form polyesters, which under favorable conditions will increase in polymer chain length. More specifically, with respect to conventional esterification of polyester monomers, the degree of polymerization (DP) obtained is a function of operating pressure for the repeating unit:

wherein R is contributed by the diol, which for polyethylene terephthalate (PET) is —$CH_2CH_2$—, and n is the degree of polymerization. The DP of the oligomer is determined by dividing the number-average molecular weight by the molecular weight of the repeating unit, which for PET is 192. In characterizing the mole percentage of components of a reaction material which may contain monomeric and oligomeric components, the number average DP of any oligomers must be determined to find the molecular weight of the oligomers.

SUMMARY OF THE INVENTION

A process has been found using a gaseous compound as the reaction medium wherein the extent of chain growth occurs beyond a DP of 40, in a superatmospheric pressure process using reaction materials preferably having a mole ratio of glycol equivalents to carboxylic acid equivalents of from 1:1 to 1.2:1, considering all possible points of reactant additions to the process, and surprisingly without added catalyst at certain pressures and temperatures.

In accordance with a fundamental aspect of the invention, there is provided in one or more polymerization stages, superatmospheric pressure (>15 psia) polymerization to form polyester beginning with a reaction material having a DP of from 1 to about 40, preferably 1 to 20, said process comprising contacting the reaction material with a low temperature ($\leq 100°$ C.) atmospheric boiling (gaseous) compound, with the polymerization reaction evolving water.

In accordance with another aspect of the invention, there is provided in two or more stages using elongated tubular reaction zones, a continuous process for polymerization of polyester precursors in the presence of a gaseous compound which has a low temperature atmospheric boiling point (<100° C.). Reaction material is fed to the first zone, which is operated at from 220° C. to 320° C., having a number average DP of 1 and comprising 50–100 mole percent mono(hydroxyalkyl) ester of a dicarboxylic acid and 0–50 mole percent bis(hydroxyalkyl) ester of a dicarboxylic acid. In any subsequent zone the reaction product of the previous zone is further reacted. Preferably the ratio of the cross-sectional area of the zones divided by the wetted perimeter is greater than 2.5 cm.

In accordance with another aspect of the invention, in a preferred embodiment, there is provided a process for polymerization of polyester reaction material from an average DP of from 1 to 10 to a polyester product having an average DP of greater than 40, and preferably greater than 90, which has no metal catalyst. Such catalyst may include, for example, metal oxides and other suitable compounds formed from, but not limited to, metals such as antimony, titanium, tin or germanium.

In accordance with another aspect of the invention, there is provided a process for reacting the traditional raw materials of dicarboxylic acid and diol—which by definition have a DP of zero—to primarily form monohydroxyalkyl ester with the over-all reaction products having a DP of from 1 to about 40 and preferably 1 to 20, and further polyesterifying the reaction products to form a polyester.

DETAILED DESCRIPTION OF THE INVENTION

The present invention is directed to an esterification polymerization process to increase the DP of feed reaction material having an average DP of 1 to 40, and increasing the DP. However, it is preferred that the reaction material have a DP of 1 to 20, and that the product have a DP of at least 70, preferably 90, and most preferably 180. The primary polymer chain growth mechanism is polyesterification and, on a molar basis, yields an excess of no more than about 20 mole percent of diol or glycol equivalents, on the basis of moles of dicarboxylic acid fed.

The reaction materials of the present invention are characterized by a mole ratio of glycol equivalents to carboxylic acid equivalents in a range of from 1.0:1 to 1.2:1, considering all possible points of reactant additions to the process, preferably from 1:1 to 1.1:1 wherein the alkyl group may be ethyl such as monohydroxyethyl terephthalate-(MHET):

also propylene, butylene, etc., e.g. mono[hydroxy(n-propyl)] terephthalate, mono[hydroxy(n-butyl)] terephthalate, or a mixture of these for forming copolymers; or bis(hydroxyalkyl) terephthalate wherein the alkyl may be the same as above, i.e., for ethyl the monomer is bishydroxyethyl terephthalate (BHET):

also propylene, butylene, etc., e.g. bis[hydroxy(n-propyl)] terephthalate, bis[hydroxy(n-butyl)] terephthalate, or mixtures of these when copolymers are being formed. When bis(hydroxyalkyl) terephthalate is employed it cannot be present in an amount greater than the mole percent of the mono(hydroxyalkyl) terephthalate. Because bis (hydroxyalkyl) terephthalate has two (2) glycol equivalents, and one dicarboxylic acid equivalent, it may be necessary to add dicarboxylic acid such that the reaction materials have a glycol equivalents to carboxylic acid equivalents mole ratio in the range of from 1.0:1 to 1.2:1, considering all possible points of reactant additions to the process. For example, if the mole ratio is 1:1 then the reaction material may be 100% mono(hydroxyalkyl) terephthalate (which has 1 glycol equivalent and 1 carboxylic acid equivalent); or the reaction material may be 50 mole percent mono (hydroxyalkyl) terephthalate, and 25 mole percent bis (hydroxyalkyl) terephthalate and 25 mole percent dicarboxylic acid.

If the desired mole ratio of glycol equivalents to carboxylic acid equivalents is 1.2 for example, the reaction material may be substantially mono(hydroxyalkyl) terephthalate with only enough hydroxyalkyl terephthalate to yield the desired mole ratio of 1.2. The reaction material may also comprise a majority of monohydroxyalkyl terephthalate (such as 60 mole percent) with less than 40 mole percent being bis (hydroxyalkyl) terephthalate, and only enough dicarboxylic acid to obtain the desired mole ratio of 1.2.

Similar variations of reaction materials may also be employed, where beneficial, when it is desired to have a starting mole ratio of glycol equivalents to carboxylic acid equivalents of less than 1.0:1, for example 0.92. It is well known to those skilled in the art that the polymerization reaction between a diol and dicarboxylic acid, selected from all of the materials subsequently named, will not proceed to a high DP if an excess of the acid species is present throughout the process. Consequently in this invention reactant materials are added at some later point in order that the overall mole ratio of glycol equivalents to carboxylic acid equivalents, considering all possible points of addition, is at least 1.0:1. In the example given where the reaction materials have a molar ratio of glycol equivalents to carboxylic acid equivalents of 0.92:1, an adjustment must be made later where 0.08 molar equivalents of glycol are added to the process.

Under the correct operating conditions the reaction materials undergo a polyesterification reaction in the presence of a gaseous compound to produce polyester, with the evolution of water, small amounts of glycol (especially when the mole ratio is greater than 1.0:1), and some amount of unreacted starting reaction material. In turbannular flow, the gas flows along the core of the tubular reactor, while polyesterification occurs in the polymer, flowing along the wall of the reactor. The gas flowing in the center of the tube allows removal of the by-products of polyesterification, and any by-products resulting from polycondensation, from the polymer melt. This occurs at the polymer melt surface by diffusion into the gas phase.

Suitable dicarboxylic acids include but are not limited to: oxalic, malonic, succinic, glutaric, adipic, pimelic, suberic, azelaic, sebacic, maleic, fumaric, phthalic, isophthalic, terephthalic, those derived from naphthalene, anthracene, anthraquinone, biphenyl, and hemimellitic, or a mixture of these. Additionally, dicarboxylic anhydrides may be used in this process. Suitable such compounds include, but are not limited to: succinic anhydride, maleic anhydride, phthalic anhydride, and those anhydrides arising from the dicarboxylic acids derived from naphthalene, anthracene, anthraquinone and biphenyl, or a mixture of these.

Suitable materials that provide glycol equivalents (such as diols and glycols) include but are not limited to: ethylene glycol, 1,3 propanediol, 1,4 butanediol, cyclohexyldimethanol, bisphenol-A and hydroquinone, or a mixture of these.

The pipe or tubular reactor(s) contemplated for use in the process of the present invention should be operated at a sufficient temperature whereby the reaction materials are pumpable. For the reaction materials set forth herein the temperature range is from 220° C. to 320° C. Operation in this range is necessary to melt the reaction materials, without the degradation caused by higher temperatures. Additionally, operation at superatmospheric pressures is generally only limited at the upper end by operating costs. For some conditions, the higher the pressure the more increase in DP that can be obtained. However a pressure reactor operating above about 2500 psia is more costly to operate, and in addition has a higher capital equipment cost. The preferred pressure range for this process is from 100–2500 psia and more preferably from 100–1000 psia.

The polyester polymers produced according to the methods of the present invention include polyester homopolymers, or as in the embodiment wherein one or more comonomers are employed in combination with polyester forming monomers, the resulting polyester polymers may be copolymers. Comonomers used as reaction materials in the method of the present invention may be any of a wide variety of conventionally employed comonomers for the production of useful copolyesters.

Suitable reaction materials capable of copolymerizing with the reaction materials of the present invention to produce copolymers according to the processes of the present invention include but are not limited to copolyesters such as those conventionally based on: terephthalic acid/ isophthalic acid/ethylene glycol; anthracene dicarboxylic acid/terephthalic acid/ethylene glycol; terephthalic acid/ isophthalic acid/cyclohexyldimethanol; hydroxybenzoic acid/terephthalic acid/bisphenol-A; terephthalic acid/ hydroxybenzoic acid/hydroquinone; terephthalic acid/ hydroxybenzoic acid/naphthalene dicarboxylic acid/ hydroquinone; terephthalic acid/ethylene glycol/1,3 propanediol; and terephthalic acid/ethylene glycol/1,4 butanediol.

The compressed gaseous medium is selected from the group of gases having atmospheric pressure boiling point temperatures (at sea level) which are less than the boiling point of water. This is critical for separating the gas from the polymer at the exit of each stage while avoiding dispersion or entrainment of polymer, and for removal of the water of reaction from the gaseous medium. Another requirement of the gaseous medium is inertness to deleterious reactions with the polymer. The gaseous media must also be stable at polymerization temperatures and form little or no degradation products. Exemplary gaseous media which exhibit these characteristics include but are not limited to ethers, ketones, carbon dioxide, and nitrogen, or mixtures of these.

Although it is preferred to operate the process of the present invention without catalysts conventionally known in the art, those skilled in the art may wish to strike a balance between increased throughput (by employing conventional catalysts) and polymer purity (without employing catalysts). The scope of the present invention covers both processes, however, the examples are without catalyst since this is unconventional.

The following working embodiments are intended merely as examples of the invention and do not define limits on the scope of the invention.

100 ml Reactor Experiments

The reactor used in this set of experiments was a stainless steel Parr brand stirred reactor with a 100 ml internal volume. A stirring rod and thermocouple were placed through bored holes in the top of the reactor. The reactor was heated with an aluminum heating block, and the temperatures of both the heater and the inside of the reactor were monitored.

The reactor vessel and components were cleaned and dried with methanol between experiments. Reaction materials (MHET, BHET, and TA) listed in the following tables were weighed, added to the vessel, and stirred. The TA listed in the table was present in the MHET reaction material as an impurity.

The level of TA in the MHET reaction material was found to be 3% by weight, based on an analysis of several samples of MHET used in the experiments. BHET was therefore added to the MHET/TA reaction material in order to balance the molar ratio of glycol equivalents to carboxylic acid equivalents, recognizing the TA impurity.

The reactor was sealed and evacuated for ten minutes. An initial amount of approximately 13.4 gm of dimethyl ether (DME) was added through an inlet port to the reactor. Different weight ratios of DME to reaction material were used during this set of experiments. With the heating block temperature set to 310° C., the interior reactor temperature reached 260° C. At 260° C., additional DME was added to bring the pressure in the reactor up to the desired pressure. (The total amount of DME added to the reactor for each experiment is shown in Table I). The experiment began when the desired setpoint pressure and temperature were achieved. The experiment was terminated after the desired reaction time by turning off the stirrer and the heater, removing the vessel from the heat source, prohibiting further reaction by rapid cooling, and then allowing the reactor to cool down to below 60° C. The reactor was then de-pressurized, opened and the product removed.

The degree of polymerization (DP) achieved during an experiment was determined by GPC (Gel Permeation Chromatograph) analysis of the product. A 10 mg sample was dissolved in 1 ml of $(CF_3)_2CHOH$ (HFIP-hexafluoroisopropanol), filtered, and injected into a conventional GPC column. A calibration table was constructed using polystyrene standards to relate GPC retention time with molecular weight, from which polymer DP was determined.

Table I lists the experimental conditions and results obtained with the 100 ml reactor. Reaction temperatures were 260° C. and reaction times were 60 minutes in each example. No polymerization catalyst was added to the reactor.

TABLE I 100 ml Reactor

| Experiment | MHET gram | BHET gram | TA gram | DME gram | Press psia | Polymer DP | Actual EG:TA Mole Ratio |
|---|---|---|---|---|---|---|---|
| 1 | 6.79 | 0.98 | 0.21 | 22.8 | 1700 | 5.7 | 1.07 |
| 2 | 1.94 | 0.28 | 0.06 | 22.9 | 1700 | 10.4 | 1.07 |
| 3 | 0.525 | 0.25 | 0.225 | 24.8 | 1800 | 21.0 | 0.92 |
| 4 | 0.485 | 0.00 | 0.015 | 22.8 | 1700 | 23.7 | 0.96 |
| 5 | 0.485 | 0.02 | 0.015 | 23.4 | 1700 | 24.8 | 1.00 |
| 6 | 0.485 | 0.035 | 0.015 | 23.9 | 1700 | 28.5 | 1.02 |
| 7 | 0.485 | 0.13 | 0.015 | 22.9 | 1700 | 29.4 | 1.15 |
| 8 | 0.485 | 0.19 | 0.015 | 22.9 | 1700 | 31.0 | 1.21 |
| 9 | 0.53 | 0.25 | 0.23 | 38.2 | 3000 | 32.0 | 0.92 |

25 ml Reactor Experiments

The apparatus, experimental procedure and analysis used in the following experiments were identical to those described previously, with the exception of the reactor internal volume, which for this set of experiments was 25 ml.

Table II lists the experimental conditions and results obtained with the 25 ml reactor. Reaction temperatures were again 260° C. and reaction times were 90 minutes for each example in the table. No polymerization catalyst was added to the reactor.

TABLE II 25 ml Reactor

| Experiment | MHET gram | BHET gram | TA gram | DME gram | Press psia | Polymer DP | Actual EG:TA Mole Ratio |
|---|---|---|---|---|---|---|---|
| 1 | 3.15 | 1.50 | 1.35 | 9.0 | 1800 | 4.7 | 0.92 |
| 2 | 2.10 | 1.00 | 0.90 | 10.4 | 1800 | 5.9 | 0.92 |

The results in Table II can be compared to those in Table I. The lower DP value of the product listed is related to the smaller volume of the reactor used in the experiments and the larger amounts of materials added to the reactor, on a mass to volume basis.

Experiments in $CO_2$

Table III lists the experimental conditions and results obtained when $CO_2$ was employed as the gaseous medium instead of DME. For these experiments the 100 ml batch reactor was used. The reaction temperatures were 270° C. and reaction times were 60 minutes for the examples in the table. No polymerization catalyst was added to the reactor.

TABLE III 100 ml Reactor with $CO_2$

| Experiment | MHET gram | BHET gram | TA gram | $CO_2$ gram | Press psia | Polymer DP | Actual EG:TA Mole Ratio |
|---|---|---|---|---|---|---|---|
| 1 | 7.83 | 1.13 | 0.24 | 8.73 | 1300 | 3.67 | 1.07 |
| 2 | 1.94 | 0.28 | 0.059 | 9.14 | 1360 | 9.93 | 1.07 |
| 3 | 1.94 | 0.28 | 0.059 | 12.0 | 1780 | 10.0 | 1.07 |
| 4 | 0.43 | 0.062 | 0.013 | 6.86 | 1020 | 19.3 | 1.07 |
| 5 | 0.106 | 0.015 | 0.003 | 12.1 | 1800 | 34.4 | 1.07 |

Staged Experiments

High polymer DP's were achieved using low mole ratio reaction materials (within the claimed molar ratio range) by performing the reaction in a series of successive stages. At the conclusion of each stage, the gaseous medium, containing water, a trace amount of glycol and any low molecular weight by-product impurity was expelled and the reactor refilled with the clean gas medium. The invention therefore provides unexpectedly purer polymers of commercially usable molecular weight by way of successive staged reactions using fresh gaseous medium in each stage. The method of operating the process in successive stages is described below. The first stage in the reaction series was performed in two parts. After completion of the first part of reaction stage 1 in the required time, the reactor pressure was reduced, unsealed to remove the used gaseous medium, and a charge of fresh gas was added. In all stages in the experiments listed in Table IV, approximately 23 grams DME was used as the gaseous medium each time the gas was exchanged. The reactor was then re-sealed and re-heated, and the second part of stage 1 was initiated.

The product from the second part of stage 1 was then collected as described previously and part of the sample was used to measure the DP of the product (10.4). The second and each subsequent stage had only one part. A known weight of product from the previous stage, of known DP, was added back to the reactor and the material ground to a fine powder in the reactor. The experiment was then performed again with new gaseous medium and the cycles repeated until the necessary program had been completed. After the first cycle, product was withdrawn at the end of each cycle for analysis.

In order to better quantify the DP of the product samples from these staged experiments, the GPC calibration was modified using PET standards of known molecular weight, to improve the accuracy of the measurement of molecular weight in the high-DP region. All subsequent data reported here is referenced against this new GPC calibration curve.

Table IV lists the experimental conditions and results of the staged reactions conducted with 23 grams of DME. In these experiments, the 100 ml reactor was used. All experiments described in Table IV were performed at 260° C. for 60 minutes without any added catalyst.

TABLE IV

Staged Experiments in 100 ml Reactor with DME

| Stage | MHET gram | BHET gram | TA gram | DME gram | Press psia | Polymer DP | Actual EG:TA Mole Ratio |
|---|---|---|---|---|---|---|---|
| 1 | 1.94 | 0.28 | 0.06 | 23.0 | 1700 | 10.40 | 1.07 |

| Stage | PET* gram | Input DP | DP Increase in Stage | DME gram | Press psia | Output DP |
|---|---|---|---|---|---|---|
| 2 | 2.00 | 10.4 | 18.9 | 23.0 | 1700 | 29.3 |
| 3 | 1.70 | 29.3 | 6.6 | 23.0 | 1700 | 35.9 |
| 4 | 1.50 | 35.9 | 2.2 | 23.0 | 1700 | 38.1 |
| 5 | 1.40 | 38.1 | 3.0 | 23.0 | 1700 | 41.1 |

Note*
The PET used is the product from the previous stage

Table V describes staged experiments conducted with $CO_2$ in the 100 ml reactor using procedures similar to those described for Table IV. Reaction temperatures were 260° C. and residence times were 60 minutes. No polymerization catalyst was added.

TABLE V

Staged Experiments in 100 ml Reactor with $CO_2$

| Stage | MHET gram | BHET gram | TA gram | $CO_2$ gram | Press psia | Polymer DP | Actual EG:TA Mole Ratio |
|---|---|---|---|---|---|---|---|
| 1 | 1.94 | 0.28 | 0.06 | 24.4 | 1700 | 23.7 | 1.07 |

| Stage | PET* gram | Input DP | DP Increase in Stage | $CO_2$ gram | Press psia | Output DP |
|---|---|---|---|---|---|---|
| 2 | 2.10 | 23.7 | 10.7 | 24.4 | 1700 | 34.3 |
| 3 | 1.90 | 34.3 | 8.0 | 24.4 | 1700 | 42.3 |
| 4 | 1.70 | 42.3 | 1.3 | 24.4 | 1700 | 43.6 |
| 5 | 1.50 | 43.6 | 2.6 | 24.4 | 1700 | 46.2 |
| 6 | 1.30 | 46.2 | 3.2 | 24.4 | 1700 | 49.4 |
| 7 | 1.10 | 49.4 | 8.6 | 24.4 | 1700 | 58.0 |

Note*
The PET used is the product from the previous stage.

The experimentally determined "within stage" DP increase trended generally downwards with increasing number of stages, after the first two stages, throughout the experiment.

To achieve a more commercially-useful (i.e. higher DP) polymer from this process than those described in Tables IV and V, the polymerization process was staged more frequently, using a smaller amount of material. This effectively reduces the amount of by-products generated in the closed and confined space of the batch reactor in each stage, and better simulates a continuous process. For this example a total of 0.050 g of reaction material was used comprising 0.043 g MHET, 0.006 g BHET, and 0.001 g TA, representing a glycol equivalent to carboxylic acid equivalent molar ratio in the reaction materials of 1.08:1. This material was placed in the 100 ml batch reactor without catalysts, pressurized with $CO_2$ to 500 psia, and heated to 280° C. The polymerization was staged 15 times successively, the first 5 stages for 30 minutes each and the last 10 stages for 20 minutes each for a total of 350 minutes of staged reaction time. At the end of this experimentation, the material had a DP of 91.

All the Reactor Experiments previously described were the foundation for proving that the polyesterification reaction of the invention is possible. However, these reactions were all single batch reactions or staged, successive batch reactions requiring a large gaseous volume. From a commercial point of view batch reactions are impractical. In the following examples a polyesterification process is described employing a pipe or tubular reactor having a continuous flow, with at least the exit area of the reactor being in turbannular flow.

Continuous Flow Tubular Reactors

In turbannular flow, the gas flows along the core of the tubular reactor, while polyesterification occurs in the polymer, flowing along the wall of the reactor. The gas flowing in the center of the tubular reactor facilitates the removal from the polymer melt of the by-products of polyesterification, and any by-products resulting from polycondensation. This occurs at the polymer melt surface by diffusion into the gas phase.

In the process of the present invention, turbannular flow is maintained at high gas mass flow rates and low gas velocities by operating at high gas densities. In any part of the tubular reactor the partial pressure of the water or of the glycol, if present, in the gas phase, must be low enough to promote diffusion of the by-product from the molten polymer to the gas phase, thus acting to promote chain growth of the polymer. Simultaneously the gas and polymer flows in the tubular reactor must be such that turbannular flow develops. If the gas velocity is too great, the flow pattern will become 'dispersed' instead of turbannular. If the gas velocity is too small, the flow pattern will become unstable and 'chaotic slugs' of polymer and gas will form, resulting in unstable conditions in the tubular reactor. At very low gas velocities the flow pattern becomes 'stratified'. Turbannular flow is the preferred flow regime for efficient polymerization and this condition develops over the latter part of the tubular reactor, but generally for the initial stage of the reaction in the inlet of the reactor the turbannular flow pattern is not fully established. Under the proper operating conditions turbannular flow is always present near the exit stage of the reactor.

Figure 1:
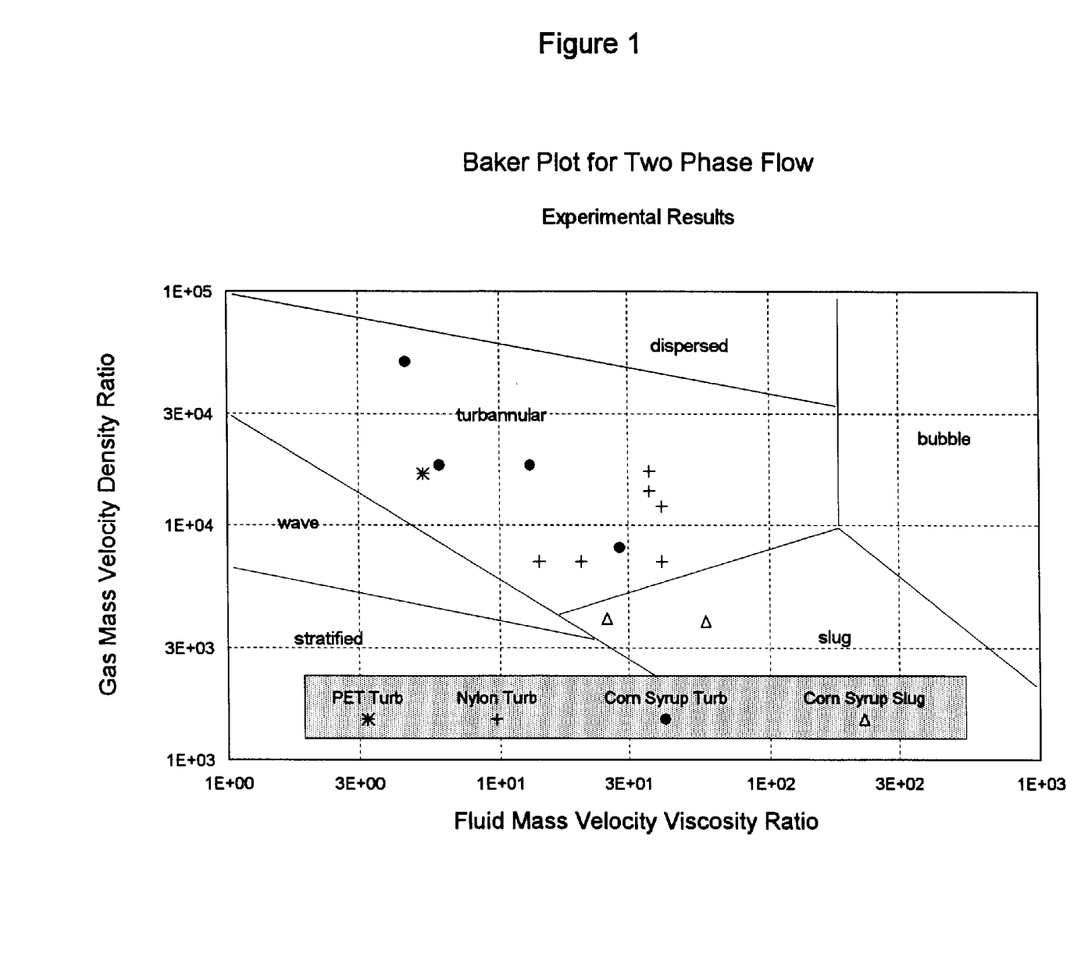
FIG. 1 is a Baker plot of the flow regime of various two phase systems.

The concept of different flows in two phase systems is well known and is characterized by a 'Baker' plot. Such a diagrammatic picture of the flow regimes is shown in FIG. 1. The data points illustrated on the plot refer to those processes known and/or operated by the present inventors. As a partial explanation of the Baker plot, the data plotted on the ordinate axis is calculated from data relating to the gas phase component of the process, and that on the abscissa from data relating to the melt phase component of the process.

EXAMPLE 1

Table VI illustrates the advantage of using a high pressure (dense) gas over a low pressure conventional system, when used in a tubular reactor. The gas velocities are based on the total cross-sectional area and the actual gas velocities (not including the cross-sectional area of the polymer) will be greater than the tabulated values. In turbannular flow, the actual gas velocities can be up to twice the tabulated superficial values depending upon the thickness of the polymer annulus.

At the maximum reactor diameter given for Porter's low pressure gas system (4.0 in), the high gas velocity required limits the polymer throughput to about 300 lb./hr. The tubular reactor defined by the process of the present invention, however, achieves a throughput of 1000 lb./hr or more, preferably 2000 lb./hr or more, with significantly lower gas velocity under turbannular flow conditions. The lower gas velocity provides the higher polymer throughput and enables an efficient gas/polymer separation step to be achieved while avoiding any appreciable polymer entrainment in the effluent gas stream.

This throughput effect is seen in Table VI. The conditions given under nitrogen gas in Table VI are based on data from the Porter reference ('587), Example #5. In Porter's Example #5, the temperature of reaction is 292° C. The pressure at the reactor inlet was 3.72 atm and at the outlet was 1 atm. The reactor feed material had an IV of 0.29, which was raised to 0.63 in the product.

For the first row of Table VI, the temperature and inlet and outlet polymer IV's from Porter's Example #5 are used, and a constant pressure along the tube of 1 atm is assumed. The reaction diameter is set at 4 inches, which is the maximum allowable reactor diameter as taught by Porter. PET production in lb./hr as well as gas velocity are extrapolated from the values in Porter's patent.

Polymer chain length growth is measured by intrinsic viscosity (IV). An IV increase of from 0.29 to 0.63 corresponds approximately to a DP increase of from 41 to 104, calculated from the relationship.

$$IV = 1.7 \times 10^{-4} (Mn)^{0.83}$$

where Mn is the number average molecular weight of the polymer produced and the repeat unit is assumed to have a molecular weight for polyethylene terephthalate of 192.

TABLE VI

Turbannular Reactor Comparison

| Gas | PET or monomer/ oligomer lb./hr | Temp ° C. | Pressure psia | Input IV | Output IV | Gas/ PET lb./lb. | Tube Diameter inches | Gas velocity* ft/sec |
|---|---|---|---|---|---|---|---|---|
| $N_2$ | 300 | 292 | 15 | 0.29 | 0.63 | 15.5 | 4.0 | 385 |
| DME | 3000 | 292 | 1000 | 0.29 | 0.63 | 5.0 | 4.0 | 12 |
| $CO_2$ | 3000 | 292 | 1000 | 0.29 | 0.63 | 5.0 | 4.0 | 12 |

Note*
Superficial gas velocity under turbannular flow.

It has been found that by the practice of the invention utilizing a superatmospheric pressure gas under conditions where polymerization occurs primarily by removal of water, an elongated tubular polymerization reaction zone is not limited to a diameter of four inches previously identified by Porter.

Consequently, large scale tubular reactors with diameters of 4 inches and greater are operable for commercial processes.

EXAMPLE 2

To exemplify the improvements, Table VII compares the increased throughputs determined through modeling calculations. A computer based model was developed from the process data in the given examples and the data identified in the typical BAKER plot for the systems defined, and these are used to describe what can be achieved with the present invention in larger diameter reactors. The modeling conditions were similar to those in Example #5 in Porter '587 as described previously. The input PET low molecular weight oligomer had an IV of about 0.29 (40 DP) and using low pressure nitrogen in one stage, the DP is increased to 0.63 IV (104 DP). This product DP is the same with both DME and $CO_2$.

TABLE VII

Large Diameter Turbannular Reactors

| Gas | PET lb./hr | Temp ° C. | Pressure psia | Area/ Perimeter cm | Gas/ PET Mass lb./lb. | Tube Diameter inches | Gas velocity* ft/sec |
|---|---|---|---|---|---|---|---|
| N2 | 300 | 292 | 15 | 2.5 | 15.5 | 4.0 | 385 |
| DME | 6,000 | 292 | 1000 | 3.75 | 5.0 | 6.0 | 11 |
| CO2 | 10,000 | 292 | 1000 | 5.0 | 5.0 | 8.0 | 10 |

Note*
Superficial gas velocity under turbannular flow.

It was found that by the practice of the invention, polymer throughput is more than 10-fold higher than that resulting from operation under the limits imposed by low pressure turbannular flow.

Therefore the ratio of tubular cross-sectional area to the wetted perimeter in the present invention is greater than 2.5 cm, and the reactor throughput (lb./hr) of polyester is significantly higher.

Staged Polymerization Systems

EXAMPLE 3

A single stage turbannular polymerization reactor system of the invention having diameter above about 4 inches may be supplied with low molecular weight material by either a conventional primary or secondary esterifier or another tubular system, operated at conditions such that the partial pressures of glycol and water are low, as can be obtained through vacuum conditions or by dilution with an inert and different low pressure gas. A multi-stage process is a series of single stage tubular polymerization systems, which may constitute the entire production chain from raw materials to finished product.

In a turbannular flow reaction starting with EG and TA, two or more stages are needed to provide sufficient polymer chain growth by polyesterification to efficiently produce commercially usable PET resin.

In accordance with the invention, the superatmospheric pressure gas entering the tubular reactor stages must contain at most only a very small amount of moisture and/or lesser amounts of glycol by-products, corresponding to a maximum moisture level for the gas, which is dependent on the reaction temperature and pressure. The moisture level of the gas must be low enough so that the partial pressure of water in the gas is lower than the equilibrium partial pressure of water at the reaction conditions. If the partial pressure is lower than the equilibrium partial pressure, the water in the reaction system will be transported from the polymer to the gas and the polymerization will proceed. If by-product water is not transported from the polymer phase, polymerization will be impeded and there will be little increase in polymer DP. A knowledge of the equilibrium water vapor partial pressure enables us to define the required amount of gas in the system so that the reaction is carried out below this pressure in all parts of the process.

The following Table VIII specifies the amounts of DME required to reach the specified DP range starting from conventional materials EG and TA. The experimental data were used to establish the response of DP to water partial pressure. The experiments revealed the equilibrium gas to PET ratio needed to achieve the desired polymer product DP. From these data the corresponding reactor diameter and gas flow rates required for turbannular flow at, for example, 10,000 lb./hr polymer throughput were determined.

TABLE VIII

Staged Polymerization in DME Starting with EG & TA

| Stage | DP In | DP Out | Temp °C. | Pressure psia | DME/PET lb./lb. | Tube Diameter inches | Gas velocity* ft/sec |
|---|---|---|---|---|---|---|---|
| 1 | EG, TA | 9–20 | 260 | 200 | 1–7 | 5–9 | 23–49 |
| 2 | 9–20 | 38–145 | 270 | 200 | 1–8 | 5–11 | 23–38 |
| 3 | 38 | 100–180 | 270 | 200 | 3–7 | 8–11 | 27–33 |

Note*
Superficial gas velocity under turbannular flow

The successive stages preferably employ a larger diameter tubular zone and higher temperatures in order to maintain the gas velocity within the turbannular flow range while propelling the increasingly viscous polymer melt along the reaction zone.

EXAMPLE 4

In the same manner Table IX specifies the amounts of $CO_2$ required to reach the specified DP range starting from the conventional materials of EG and TA under conditions derived from actual experiments. These experiments revealed the equilibrium gas to PET mass ratio needed to achieve the desired polymer product DP. In the same manner, gas flow rates required to maintain turbannular flow using $CO_2$ using the specified reactor diameters at, for example, 10,000 lb./hr polymer flow rate were determined.

TABLE IX

Staged Polymerization in $CO_2$ Starting with EG & TA

| Stage | DP In | DP Out | Temp °C. | Pressure psia | $CO_2$/PET lb./lb. | Tube Diameter inches | Gas velocity* ft/sec |
|---|---|---|---|---|---|---|---|
| 1 | EG, TA | 9–20 | 260 | 300 | 1.5–10.5 | 5–9 | 23–49 |
| 2 | 9–20 | 38–145 | 270 | 300 | 1.5–10.6 | 5–11 | 23–34 |
| 3 | 38 | 100–180 | 270 | 300 | 3.5–8 | 8–11 | 21–26 |

Note *
Superficial gas velocity under turbannular flow.

As was shown in Table VIII and Table IX, wherein the process operates from very low DP reaction materials, the optimum diameter of the tubular reactor increases as the reaction proceeds and the polymer DP increases. Thus if we use the data in Table VIII, then stage 1 is the initial stage where the reaction material is introduced into the pipe reactor; stage 2 is a larger diameter middle portion of the reactor and stage 3 is the largest diameter portion of the reactor at the exit end where the high DP polymer is produced. The stages 1–3 can be joined in multiple reaction sections, with different diameters beginning each of the sections. In this embodiment, if desired, the conditions of pressure, temperature, and mass of gaseous medium to mass of polymer melt flow rate can be changed in each distinct reactor section.

EXAMPLES 5 and 6

Tables X and XI show examples of staged polymerization systems in which a low mole ratio material (DP of 1) was used as initial reaction material. Such reaction material, for example, comprises 40-to-90 mole percent MHET, and about 30 to 5 mole percent each of BHET and TA such that the mole ratio is from 0.90: 1.0 to 1.2:1.0. As previously taught, for reaction materials with initial mole ratios less than 1.0:1, adjustment is made in the later process to increase the overall reaction material molar ratio to at least 1.0:1. The gas velocity is based on the total cross-sectional area for turbannular flow in the reaction zone. For illustration, in Tables X and XI, a polymer throughput of 10,000 lb./hr was used to specify the reactor diameter. As required, the throughput may be changed resulting in a corresponding change in the reactor diameter.

TABLE X

Staged Polymerization in DME Starting with DP 1 Monomer

| Stage | DP In | DP Out | Temp °C. | Pressure psia | DME/PET lb./lb. | Tube Diameter inches | Gas velocity* ft/sec |
|---|---|---|---|---|---|---|---|
| 1 | 1.0 | 12–30 | 260 | 200 | 1–8 | 5–9 | 23–56 |
| 2 | 12–30 | 45–180 | 270 | 200 | 1–7.5 | 5–11 | 23–36 |

Note*
Superficial gas velocity under turbannular flow.

TABLE XI

Staged Polymerization in $CO_2$ Starting with DP 1 Monomer

| Stage | DP In | DP Out | Temp °C. | Pressure psia | $CO_2$/PET lb./lb. | Tube Diameter inches | Gas velocity* ft/sec |
|---|---|---|---|---|---|---|---|
| 1 | 1.0 | 17–40 | 260 | 100 | 1–7 | 5–11 | 46–66 |
| 2 | 17–40 | 100–180 | 270 | 100 | 2–4 | 8–11 | 36–38 |

Note*
Superficial gas velocity under turbannular flow

As the previous explanation illustrates, reaction material for the pressure polymerization process having the specified mole ratio may be selected from the group consisting of (A) a diol and a carboxylic acid, (B) a monomeric ester or esters of DP equal to 1.0, (C) an oligomeric ester or esters with an average DP greater than 1, or some combination of (A), (B), and (C) provided that the overall mole ratio of reacted and unreacted glycol equivalents to reacted and unreacted carboxylic acid equivalents lies within the range 1.0:1 to not greater than 1.2:1, considering all points of addition.

Description of the Equipment Used to Operate the Process of the Invention

Figure 2:
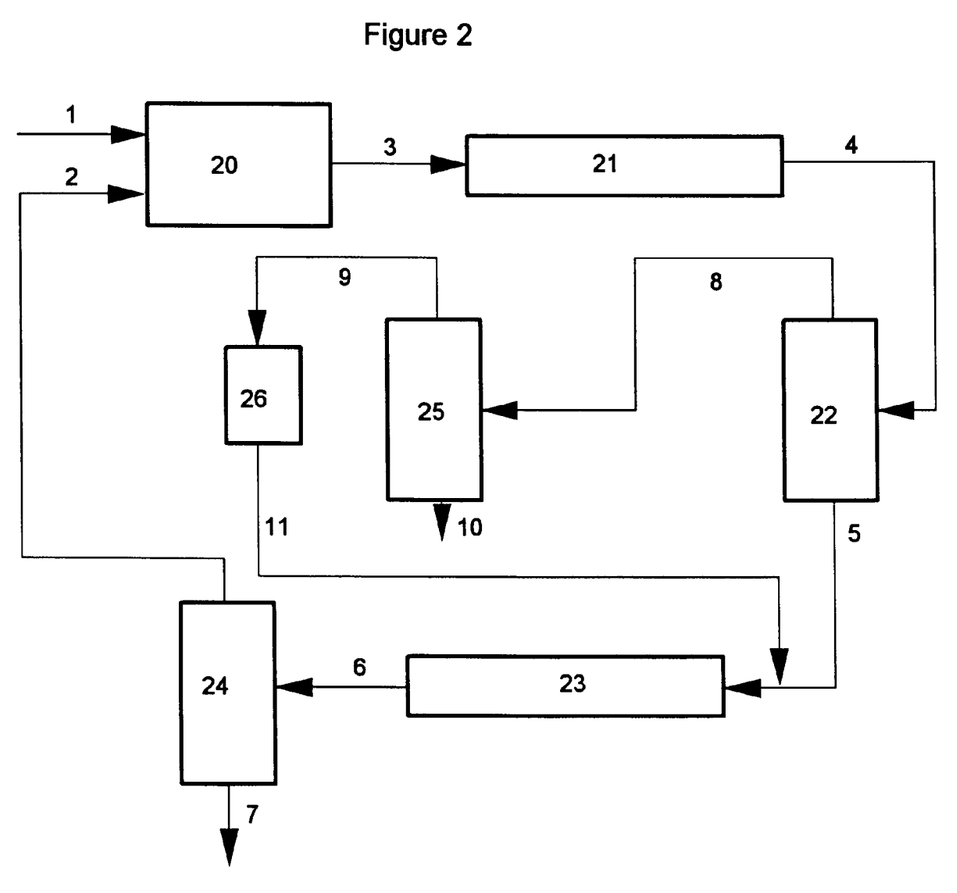
FIG. 2 is a schematic diagram of a continuous polymerization process according to the invention using first stage and second stage tubular reactors.

With reference to FIG. 2 wherein like numerals depict like structures, a continuous polymerization process is provided which is not a continuous pipe reactor, but a staged tubular reactor. The materials of construction for the vessels are beyond the scope of the disclosure, but stainless steel 304 and 316, nickel alloys including types C-276, 265, 825 and 620, and ceramic coated metals are suitable. Reaction material is fed through conduit 1 to vessel 20. Compressed gaseous compound is also fed to vessel 20 through conduit 2. A dense gas/reaction material slurry is fed through conduit 3 to tubular reactor 21 where reaction occurs and the water of reaction is transferred into the gas phase, increasing the degree of polymerization of the polymeric material. From reactor 21, the two phase material enters separation vessel 22 where the dense gas is separated from the polymer by conventional means such as by gravimetric separation. The polymer leaves the vessel from the bottom through conduit 5, and the gas flows out of the top of vessel 22 through a pressure regulating device, for example a control valve. The de-pressurized gas is fed via conduit 8 to clean-up unit 25, which may be composed of one or more vessels, where water and other compounds are removed from the gas by conventional means. Any reaction materials removed are discharged from the base of vessel 25 via conduit 10 for recovery, and any by-product gases via other conduits, not shown. The clean gas is then fed through conduit 9 to compressor 26. Clean pressurized gas enters the second stage tubular reactor, 23, with polymer from the first stage tubular reactor through conduits 11 and 5. The final product polymer DP is increased to within the range 40–180 or higher in tubular reactor 23 and the polymer is separated from the gas in vessel 24 with the gas passing through conduit 2 to vessel 20. If necessary the gas evolved from vessel 24, exiting in conduit 2, may be cleaned of any deleterious by-products in a manner similar to that used on the gas stream leaving vessel 22, before being returned to vessel 20. The polymer product is discharged from the system through conduit 7. The pressures in the tubular reactors 21 and 23 are maintained above atmospheric pressure. The preferred pressures are in the range from about 100 psia to 2500 psia, and may be different in the two reactors 21 and 23, or in the example given.

In one embodiment the gas medium comprises dimethyl ether. As an example, reactor 23 is operated at 200 psia and a temperature of 270° C. The temperature is maintained by a jacket on the tubular reactor which contains a heating or cooling medium such as a heat transfer oil. The heated tubular reaction zone is of a predetermined length based on considerations of throughput, residence time, and preferred reaction conditions.

As a specific example, a 1000 foot long reaction zone heated to 270° C. and operating at about 3 lbs. of DME per lb. of oligomeric reaction material is expected to have a residence time of about 1 hour with a gas velocity of about 27 ft/sec. The process reaction results in an increase in polymer DP from an average of 9 for the feed stream up to 50 or more for the polymer discharged from tubular reactor 23. Higher DP increases are achieved when the system is operated with higher gas-to-reaction material mass ratios. The upper limit in gas-to-reaction materials mass ratio is reached when the turbannular flow in the polymerization tubular reactor becomes unstable.

In the example above, the reaction materials for the tubular rector 23 are obtained by reacting oligomers in reactor 21 at 200 psia and 260° C., prepared from reaction material composed essentially of EG and TA entering through conduit 1, to a number average DP of 9. The oligomers exit reactor 21 through conduit 4, which is an extension of tubular reactor 21, pass into a separation vessel 22, through conduit 5, then into tubular reactor 23. The gaseous medium and gaseous by-products from the reaction in tubular reactor 23 enter the separation vessel 24, which operates at a lower pressure than reactor 23. If required, the gaseous stream exiting vessel 24 may be cleaned by employing a vessel (not shown) which is similar to gas clean-up unit 25, before recycling the gaseous stream through line 2 to vessel 20.

The product polymer discharged from tubular reactor 23 is controlled by adjusting the flow rate of the compressed gas fed to reactor 23. Control and monitoring of process temperatures, pressures, and flows is accomplished using conventional means such as would be used with conventional pumps, flow meters, and sensors as is well known in the art.

In the embodiment of the process described as part of the example above the flow of the gaseous medium is co-current with the melt polymer or oligomer phase at all times, both within and between stages. Overall the gas enters with the reaction materials and passes through the successive stages before exiting the final reactor and being recycled.

In another embodiment of the invention, the gas travels co-current within a stage but counter-stage between stages. That is, it moves sequentially from the last stage of the process to the previous to last stage, until it reaches the first stage before being recycled. Within a stage the gas flow must be co-current with the polymer flow to achieve a turbannular flow regime. Countercurrent between stage gas flow can be used to improve the overall process efficiency and economics of operation by minimizing the total amount of compressed gas required for the polymerization.

Thus it is apparent that there has been provided, in accordance with the invention, a process that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A process for preparing a polyester from hydroxyalkyl dicarboxylic acid monomers and/or oligomers comprising:
    a) introducing reaction material having a degree of polymerization of 1 to 40 of hydroxyalkyl dicarboxylic acid ester monomers and/or oligomers into a pipe or tubular reactor, wherein said reaction material has a mole ratio of glycol equivalents to carboxylic acid equivalents of from 1.0:1 to 1.2:1 considering all points of reactant additions to the process;
    b) introducing a dense gaseous medium into said reactor; and
    c) operating said reactor at superatmospheric pressure and at sufficient temperature to:
        1) achieve a turbannular flow regime comprising said reaction material and said gaseous medium before leaving the reactor;
        2) cause polyesterification to occur whereby the reaction material polymerizes to produce a polyester, with the degree of polymerization of the reaction material polymer increasing from the beginning of the reactor to the end; and
        3) produce water with little or no other reaction by-products or little or no unreacted monomers or oligomers, which are separated from the polymer product through the gaseous medium.

2. The process of claim 1, wherein the hydroxyalkyl dicarboxylic acid ester monomers are mono(hydroxyalkyl) dicarboxylic acid ester monomers, or a mixture of mono (hydroxyalkyl) dicarboxylic acid ester monomers and an equal or lesser amount of bis(hydroxyalkyl) dicarboxylic acid ester monomers.

3. The process of claim 1, wherein the said dense gaseous medium is carbon dioxide, or nitrogen, or a mixture of these.

4. The process of claim 3, wherein said dense gaseous medium is carbon dioxide.

5. The process of claim 3, wherein said dense gaseous medium is nitrogen.

6. The process of claim 1, wherein said superatmospheric pressure above 15 psia to 2500 psia and up.

7. The process of claim 1, wherein said temperature is in a range from 220° C. to 320° C.

8. The process of claim 1, wherein said reaction material and said dense gaseous medium are in co-current flow within said reactor.

9. The process of claim 3, wherein the reaction material is only mono(hydroxyethyl) terephthalate.

10. The process of claim 3, wherein the reaction material is a mixture of mono(hydroxyethyl) terephthalate and bis(hydroxyethyl) terephthalate.

11. The process of claim 2, wherein the reaction material comprises 50–100 mole percent mono(hydroxyalkyl) dicarboxylic acid esters and 0–50 mole percent bis(hydroxyalkyl) dicarboxylic acid esters.

12. The process for preparing a polyester from dicarboxylic acid or dicarboxylic anhydride and diol comprising:
   a) introducing dicarboxylic acid or anhydride and diol into a pipe or tubular reactor wherein the mole ratio of glycol equivalents to carboxylic acid equivalents is from 1.0:1 to 1.2:1, considering all points of reactant additions to the process;
   b) introducing a dense gaseous medium into said reactor; and
   c) operating said reactor at superatmospheric pressure and a sufficient temperature to:
      1) react said dicarboxylic acid or anhydride and diol producing hydroxyalkyl dicarboxylic acid ester monomer and/or oligomers having a degree of polymerization of 1 to 40;
      2) further react said hydroxyalkyl dicarboxylic acid ester monomer and/or oligomers by polyesterification by achieving turbannular flow in at least the exit portion of the reactor; and
      3) produce water with little or no other reaction by-products, or little or no unreacted monomers or oligomers, which are separated from the polymer product through the gaseous medium during reaction.

13. The process of claim 12, wherein dicarboxylic acid selected from the group consisting of oxalic, malonic, succinic, glutaric, adipic, pimelic, suberic, azelaic, sebacic, maleic, fumaric, phthalic, isophthalic, terephthalic, and those derived from naphthalene, anthracene, anthraquinone and biphenyl, and mixtures of these is introduced into the reactor.

14. The process of claim 12, wherein a dicarboxylic anhydride selected from the group consisting of succinic anhydride, maleic anhydride, phthalic anhydride, those derived from the dicarboxylic acids of naphthalene, anthracene, anthraquinone or biphenyl, and mixtures of these is introduced into the reactor.

15. The process of claim 12, wherein the diol is cyclohexyldimethanol, bisphenol-A, hydroquinone, ethylene glycol, 1,3 propanediol, 1-4 butandiol, or a mixture of these.

16. The process of claim 12, wherein all reactions occur without a conventional catalyst and the degree of polymerization, of the polymer is greater than 70.

17. The process of claim 12, wherein the reactor pressure is greater than 15 psia and up to 2500 psia and the reactor temperature is from 220 to 320° C.

18. The process of claim 12, wherein said reactions occurs with one or more conventional catalysts.

19. The process of claim 2, wherein the mono(hydroxyalkyl) dicarboxylic acid ester is mono(hydroxyethyl) terephthalate, mono[hydroxy(n-propyl)] terephthalate or mono[hydroxy(n-butyl)] terephthalate.

20. The process of claim 2, wherein the bis(hydroxyalkyl) dicarboxylic acid ester is bis(hydroxyethyl) terephthalate, bis[hydroxy(n-propyl)] terephthalate or bis[hydroxy(n-butyl)] terephthalate.

21. The process of claim 1, wherein the reaction material comprises sufficient dicarboxylic acid as needed to obtain a mole ratio of glycol equivalents to carboxylic acid equivalents of from 1.0:1 to 1.2:1.

22. The process of claim 18 wherein the catalyst is a compound of antimony, titanium, tin or germanium.

23. The process of claim 11 wherein the reaction material comprises a majority of mono(hydroxyalkyl) terephthalate and less than 40 mole percent of bis(hydroxyalkyl) terephthalate.

24. The process of claim 12, wherein all reactions occur without a catalyst which is a compound of antimony, titanium, tin or germanium.

25. The process of claim 1 wherein the gaseous medium is inert to deleterious reactions with the polymer and stable at the polymerization temperatures and has an atmospheric pressure boiling point temperature at sea level which is less than the boiling point of water.

26. The process of claim 12 wherein the gaseous medium is inert to deleterious reactions with the polymer and stable at polymerization temperatures and has an atmospheric pressure boiling point temperature at sea level which is less than the boiling point of water.

27. A process for preparing a polyester from hydroxyalkyl dicarboxylic acid ester monomers and/or oligomers comprising:
   a) introducing reaction material comprising hydroxyalkyl dicarboxylic acid ester monomers and/or oligomers and having an average degree of polymerization of 1 to 40 into a pipe or tubular reactor, wherein said reaction material has a mole ratio of glycol equivalents to carboxylic acid equivalents of from 1.0:1 to 1.2:1 considering all points of reactant additions to the process;
   b) introducing a compressed gaseous medium into said reactor; and
   c) operating said reactor at superatmospheric pressure and at sufficient temperature to:
      1) melt the reaction material;
      2) cause the reaction material to undergo a polyesterification reaction in the presence of the gaseous medium to produce polyester, with evolution of water; and
      3) achieve turbannular flow of molten polymer along the wall of the reactor and a gas phase flowing co-currently along the core of the reactor, whereby water which evolves from the polyesterification is removed from the molten polymer by diffusion therefrom into the gas phase.

28. A process according to claim 27 wherein the gaseous medium is inert to deleterious reactions with the polymer and stable to the polymerization temperatures and has an atmospheric boiling point temperature at sea level which is less than the boiling point of water and a moisture level such that the partial pressure of water in the gas is lower than the equilibrium partial pressure of water at the reaction conditions.

29. A process according to claim 28 wherein the reactor is operated at a temperature of 220–320° C. and a pressure in the range 100–2500 psia.

30. A process according to claim 27 wherein the reactor is operated at a temperature of 220–320° C. and a pressure which is above 11 psia and up to 2500 psia.

31. A process according to claim 28 wherein the reaction material has a number average degree of polymerization of 1 and comprises 50–100 mole percent mono(hydroxyalkyl) ester of a dicarboxylic acid and 0–50 mole percent bis (hydroxyalkyl) ester of a dicarboxylic acid.

32. A process according to claim 31 wherein the reaction material is 100% mono(hydroxyethyl) terephthalate.

33. A process according to claim 31 wherein the reaction material comprises a majority of mono(hydroxyalkyl) terephthalate and less than 40 mole percent of bis (hydroxyalkyl) terephthalate.

34. A process according to claim 28 which is carried out with no metal catalyst.

35. A process for preparing a polyester from a dicarboxylic acid or dicarboxylic anhydride and a diol comprising:
   a) introducing into a pipe or tubular reactor a dicarboxylic acid or anhydride and a diol wherein the mole ratio of glycol equivalents to carboxylic acid equivalents is from 1.0:1 to 1.2:1, considering all points of reactant additions to the process;
   b) introducing a compressed gaseous medium into said reactor; and
   c) operating said reactor at superatmospheric pressure and a sufficient temperature to;
      1) cause said dicarboxylic acid or anhydride and diol to react in the presence of said gaseous medium to produce hydroxyalkyl dicarboxylic acid ester monomers and/or oligomers in molten form having a degree of polymerization of 1 to 40;
      2) further cause said hydroxyalkyl dicarboxylic acid ester monomers and/or oligomers to undergo a polyesterification reaction in the presence of the gaseous medium to produce polyester, with evolution of water and
      3) achieve turbannular flow of molten polymer along the wall of the reactor and a gas phase flowing co-currently along the core of the reactor, whereby water which evolves from the polyesterification is removed from the molten polymer by diffusion therefrom into the gas phase.

36. A process according to claim 35 wherein the gaseous medium is inert to deleterious reactions with the polymer and stable to the polymerization temperatures and has an atmospheric boiling point temperature at sea level which is less than the boiling point of water and a moisture level such that the partial pressure of water in the gas is lower than the equilibrium partial pressure of water at the reaction conditions.

37. A process according to claim 36 wherein the reactor is operated at a temperature of 220–320° C. and a pressure in the range 100–2500 psia.

38. A process according to claim 35 wherein the reactor is operated at a temperature of 220–320° C. and a pressure which is above 15 psia and up to 2500 psia.

39. A process according to claim 36 wherein the dicarboxylic acid is oxalic, malonic, succinic, glutaric, adipic, pimelic, suberic, azelaic, sebacic, maleic, fumaric, phthalic, isophthalic or terephthalic or a dicarboxylic acid derived from naphthalene, anthracene, anthraquinone or biphenyl or a mixture of these and the dicarboxylic anhydride is succinic anhydride, maleic anhydride, phthalic anhydride or an anhydride of a dicarboxylic acid derived from naphthalene, anthracene, anthraquinone or biphenyl or a mixture of these and the diol is ethylene glycol, 1,3-propanediol, 1,4-butanediol, cyclohexyldimethanol, bisphenol-A or hydroquinone or a mixture of these.

40. A process according to claim 36 which is carried out with no metal catalyst.

41. A process according to claim 1 wherein the ratio of tubular cross-sectional area to the wetted perimeter of the reactor is greater than 2.5 cm.

42. A process according to claim 12 wherein the ratio of tubular cross-sectional area to the wetted perimeter of the reactor is greater than 2.5 cm.

43. A process according to claim 27 wherein the ratio of tubular cross-sectional area to the wetted perimeter of the reactor is greater than 2.5 cm.

44. A process according to claim 35 wherein the ratio of tubular cross-sectional area to the wetted perimeter of the reactor is greater than 2.5 cm.

* * * * *